US006150600A

United States Patent [19]

Buchla

[11] Patent Number: 6,150,600

[45] Date of Patent: Nov. 21, 2000

[54] INDUCTIVE LOCATION SENSOR SYSTEM AND ELECTRONIC PERCUSSION SYSTEM

[76] Inventor: Donald F. Buchla, P.O. Box 10205, Berkeley, Calif. 94709

[21] Appl. No.: 09/203,256

[22] Filed: Dec. 1, 1998

[51] Int. Cl.[7] .............................. G01P 3/42; G10H 5/00

[52] U.S. Cl. .............................. 84/688; 84/689; 84/733

[58] Field of Search .............................. 84/688, 689, 733

[56] References Cited

U.S. PATENT DOCUMENTS

| | | | |
|---|---|---|---|
| 1,661,058 | 2/1928 | Theremin . | |
| 4,524,348 | 6/1985 | Lefkowitz . | |
| 4,980,519 | 12/1990 | Mathews | 178/19 |
| 5,247,261 | 9/1993 | Gershenfeld | 324/716 |
| 5,541,358 | 7/1996 | Wheaton et al. | 84/645 |
| 5,567,920 | 10/1996 | Watanabe et al. | 178/18 |
| 5,661,470 | 8/1997 | Karr | 340/825.54 |
| 5,973,318 | 10/1999 | Plesko . | |

*Primary Examiner*—Jeffrey Donels
*Attorney, Agent, or Firm*—Law Offices of Terry McHugh

[57] ABSTRACT

A system and a method for sensing the location of a remote object relative to a base object involve integrating inductive loop antennas with variable loop density into the base object and utilizing the antennas to transmit energy to and receive energy from an LC resonant circuit that is integrated into the remote object. The amplitude of a signal generated by the inductive loop antennas in response to energy received from the LC circuit identifies the location of the LC circuit relative to the antennas. Preferably, the sensing system is integrated into an electronic percussion instrument, where the keys of the instrument are formed with overlapping inductive loop antennas and the mallets used to activate the keys are formed with LC resonant circuits integrated into the mallet heads. In an enhanced version of the instrument, each antenna can be driven at multiple frequencies and made responsive to frequency-specific mallets, thereby creating an instrument that has continuous responsiveness over at least one lateral dimension of each key.

20 Claims, 9 Drawing Sheets

INDUCTIVE LOCATION SENSOR SYSTEM AND ELECTRONIC PERCUSSION SYSTEM

TECHNICAL FIELD

The invention relates to location sensors and more particularly to inductive location sensors that can be applied to an electronic percussion instrument.

BACKGROUND ART

Inductor-capacitor (LC) resonant circuits are known to be used to determine the proximity of one object to another. For example, in U.S. Pat. No. 5,661,470, entitled "Object Recognition System," issued to Karr, an LC resonant circuit tuned to a particular frequency is placed inside an object such as a toy. A base unit, which may include another toy, has an inductive loop that sends out electromagnetic energy pulses at the particular frequency such that the LC resonant circuit within the object responds to the base unit with energy at the same frequency only if the LC resonant circuit is sufficiently close to the base unit to receive the transmitted energy. If the LC resonant circuit responds to the base unit, the base units initiates a pre-established response, such as making a sound or turning on a motor. The described system is only sensitive to the proximity of the LC resonant circuit of the object with respect to the inductive loop of the base unit. That is, the system can identify whether or not the LC resonant circuit is within a certain distance from the base unit, but cannot further identify location information.

Karr also discloses systems which utilize multiple inductive loops in a base unit to better determine the location of an LC resonant circuit with respect to the base unit. In one example, multiple independent inductive loop antennas are arranged in a side-by-side format such that the inductive loop antenna that is closest to the LC resonant circuit will receive the strongest signal from the LC resonant circuit, thereby identifying the location of the LC resonant circuit with respect to the inductive loop antennas. In another example, multiple independent inductive loops are arranged in a matrix, creating a grid system in which strong signals are identified by both a row inductive loop and a column inductive loop, thereby pinpointing a particular location of the LC resonant circuit with respect to the matrix of inductive loop antennas. As described, both of these systems require multiple inductive loops in order to determine the location of an object relative to another object.

Inductive proximity systems implemented into electronic keyboards (either musical or alphanumeric) are known and disclosed in Karr and in U.S. Pat. No. 5,567,920, entitled "Position Reading Apparatus and Keyboard Apparatus," issued to Watanabe et al. (hereinafter Watanabe). Karr discloses a multiple frequency LC resonant circuit integrated into a keyboard that is manipulated to cause a base unit to play music. In Karr, the multifrequency LC resonant circuit is tuned to a particular frequency by activating a key. Each frequency in the LC resonant circuit corresponds to one keyboard key and provides one response per key. Likewise, Watanabe discloses a multiple frequency LC resonant circuit that is integrated into a keyboard with a one-key-to-one-frequency correspondence. As in Karr, depression of a key on the keyboard tunes the LC resonant circuit to a particular frequency with the tuned circuit resonating at a frequency that triggers a corresponding action to be taken by a receiving unit.

In the art of electronic percussion musical instruments, such as xylophones and marimbas, keys that are activated with force-sensing resistors or piezoelectric transducers are known. Force-sensing resistors indicate when a key is impacted, as well as the force with which the key is impacted, yet the force-sensing resistors have no sensitivity as to what area on the key is struck. For example, the force-sensitive resistors do not indicate whether a key is struck on the upper end of the key or on the lower end of the key. In addition, force-sensing resistors are incapable of responding to the mere presence of a mallet or to sustained contact between a mallet and a key.

Another electronic percussion instrument is disclosed in U.S. Pat. No. 4,980,519, entitled "Three Dimensional Baton and Gesture Sensor," issued to Mathews. The electronic drum of Mathews utilizes batons that actively transmit radio frequency signals to a position sensor. The batons are physically wired to the sensor system in order to drive the signals that are transmitted from the batons. While the electronic drum works well for its intended purpose, having batons that are tethered to a fixed object severely limits the expressive ability of a percussionist to freely manipulate the batons.

In view of the limitations involved with identifying a particular location using inductive sensors and with the limitations in the degrees of freedom provided by the keys of traditional force-sensitive keyboards, what is needed is an inductive sensor system that can expand the capability of key-based systems such as electronic musical instruments.

SUMMARY OF THE INVENTION

A system and method for sensing the location of a remote object relative to a base object involve integrating inductive loop antennas with variable loop density into the base object and utilizing the antennas to transmit energy to and receive energy from an LC resonant circuit that is integrated into the remote object. As a result, the amplitude of signals generated by the inductive loop antennas in response to energy received from the LC circuit may be used to identify the location of the LC circuit along an axis within the boundary of the antennas. In accordance with the invention, the inductive loop antennas are driven to generate electromagnetic energy at a particular frequency and the LC resonant circuit is tuned to resonate at the same particular frequency. If the LC resonant circuit receives energy from the inductive loop antennas, the LC circuit will resonate and generate current that is retransmitted in the form of electromagnetic energy to the antennas. The inductive loop antennas will output response signals having amplitudes that depend on the loop density at the location of the antennas that is closest to the LC circuit. Utilizing the amplitudes of the response signal from the two antennas in a first order linear approximation, an accurate determination of the location of the remote object relative to the base object can be made, even when there is no physical contact between the two objects.

In a preferred embodiment, the sensing system and method are implemented into an electronic percussion instrument, where the keys of the instrument are formed with inductive loop antennas and the mallets used to activate the keys are formed with LC resonant circuits integrated into the mallet heads. In addition to the keys and the mallets, a preferred instrument includes a switching circuit, a drive signal generator, a response signal receiver, and a processor that issues control signals that report the locations and velocities of the mallets with respect to the instrument. The control signals may be routed to a synthesizer, an amplifier, or a speaker or they may be utilized for other functions.

In its simplest form, each key of a preferred instrument includes two overlapping inductive loop antennas with variable loop density generating electromagnetic energy at one known frequency and all of the keys are responsive to a single mallet that has its LC resonant circuit tuned to the same frequency as the antennas. The mallet is a device that is not attached to any other device and that includes a conventional LC resonant circuit tuned to resonate at a particular frequency, with the LC resonant circuit being integrated into the mallet head and referred to generically as the responder. The preferred mallet head contains three separate LC resonant circuits that are composed of wire coils and capacitor combinations which form the three LC circuits. The three LC resonant circuits are formed by wrapping conductive wire around the mallet head, attaching capacitors to the respective conductive wires, and locating the capacitors within the mallet head. The LC resonant circuit configurations are designed to allow location detection regardless of the orientation of the mallet as it strikes the keyboard. Although LC resonant circuits are preferred, other circuits may be used to provide similar functionality.

Each of the overlapping antennas is an inductive loop circuit that is preferably formed by continuous loops of printed circuit conductors, although each antenna can be formed by multiple non-loop antenna segments that are configured to provide a varying segment density. The antennas are capable of both transmitting and receiving electromagnetic energy, referred to respectively as output energy from the antennas and input energy from the LC resonant circuit. The antennas are capable of transmitting repetitive bursts of electromagnetic energy at particular frequencies. In addition, the antennas receive drive signals and transmit response signals, with the term "drive signals" being used throughout the specification to refer to electrical signals being transferred from the drive signal generator to the antennas, and the term "response signals" referring to signals transferred from the antennas to the response signal receiver.

The preferred variable loop density antennas have a boundary that is identified by the outermost inductive loops, and the preferred antennas are formed from continuous conductors attached to a flat, non-conductive surface. Because the inductive loop antennas have a variable density of inductive loops, when exposed to energy from a particular location, the antennas generate response signals that relate to the location of the received input energy. Specifically, for a given strength of input energy, the amplitude of response signals generated when the input energy is being generated near a high loop density area of an antenna is higher than the amplitude of the response signal generated when the input energy is generated near an area of low loop density. As a result, the amplitude of the responses from the two overlapping antennas can be translated into position identifiers using basic mathematical relationships. In the electronic percussion instrument, the antennas are formed on a flat surface into the size and shape of a percussion key, with the percussion key being sensitive to the particular location on the key that is struck by the specially equipped mallet.

The switching circuit is configured to alternatingly connect the antennas to the drive signal generator and the response signal receiver. The drive signal generator controls the energy that is output from the antennas. Specifically, the drive signal generator controls the timing, the frequency, and the intensity of energy that is emitted from the antennas by means of signals that are directed to the antennas. The frequency of output energy generated by the antennas in response to drive signals can be manipulated over a range of frequencies in order to create a multiple frequency system. For example, in an alternative embodiment, there are four frequencies per key and therefore the drive signal generator must be able to drive the inductive loop antennas at all four frequencies. The response signal receiver manipulates the response signals to transform the input energy received by the antennas into digital electrical signals. In order to transform the input energy into digital electrical signals, frequency filters, analog detectors, and/or analog-to-digital converters may be implemented.

The processor is a conventional processor that may include hardware and software. Preferably, the processor converts digital signals from the response signal receiver into control signals that identify which keys are activated by which mallet(s), and additionally, the proximity and location of the mallet(s) with respect to the key(s). These control signals may be routed to a synthesizer to control various aspects of sound.

In operation, the drive signal generator transmits drive signals to the two overlapping antennas, causing the inductive loop antennas to transmit bursts of output energy at a specific frequency. The LC circuit within the mallet receives the output energy and retransmits input energy, at the same frequency, back to the antennas in proportion to the strength of the output energy that was received by the LC circuit. The antennas receive the input energy and generate response signals that are sent to the response signal receiver. The response signal receiver measures the amplitude of the response signals and activates a key when an activation threshold is exceeded. In addition, the amplitude of the response signals relates to the loop density of the antennas at the location within the boundary of the two inductive loop antennas that is nearest to the source of the input energy. The amplitudes of the signals are used to calculate a location of the mallet relative to an axis of the antenna. Once the location of the responder relative to the antenna is known, a control signal assigned to the specific location within the antenna can be identified, with the control signal being related to an aspect of a sound.

It should be pointed out that physical contact between the antennas and the responder is not the mechanism that activates the key, rather it is the transmission of energy between the inductive loop antennas and the tuned LC resonant circuit that triggers activation of a key. In order to increase the degrees of freedom inherent in the instrument, each key can be driven to transmit energy at one of four different frequencies and four different mallets tuned to the four different frequencies can be used to activate the keys. The resultant differentiation between mallets can be used, for example, to generate different sounds, or to control various aspects of sounds. Although four mallets and four frequencies are described, other numbers of mallets and/or frequencies can be implemented.

In an enhancement of the invention, the inductive location sensors can be employed to determine the approach and/or release velocity of a mallet head as the mallet head travels toward or away from a key. Velocity is determined in accordance with the invention by comparing the change in proximity of a mallet head over a time interval. The change in proximity is determined from the change in amplitude of a signal over a time interval, and therefore velocity is determined by comparing the change in amplitude of a response signal that is caused by an approaching or releasing mallet head. When applied to a percussion instrument, knowing the velocity of approaching or releasing mallet heads adds another dimension to the capabilities of the keyboard.

Advantages of the invention are; each key of the instrument can be made to have continuous responsiveness over a dimension of the key, each key can be uniquely responsive to multiple frequency-specific mallets, and each key can be responsive to the approach and release velocities of a mallet. In a percussion instrument equipped with multiple keys, this wide range of variables can be utilized to create rich musical sound. An additional advantage is that the use of passive LC circuits in the mallets enables the use of mallets that are identical in weight, balance, and shape to conventional mallets, and that are not tethered to a fixed object. With untethered mallets, a percussionist is able to freely manipulate the mallets.

DETAILED DESCRIPTION

Figure 1:
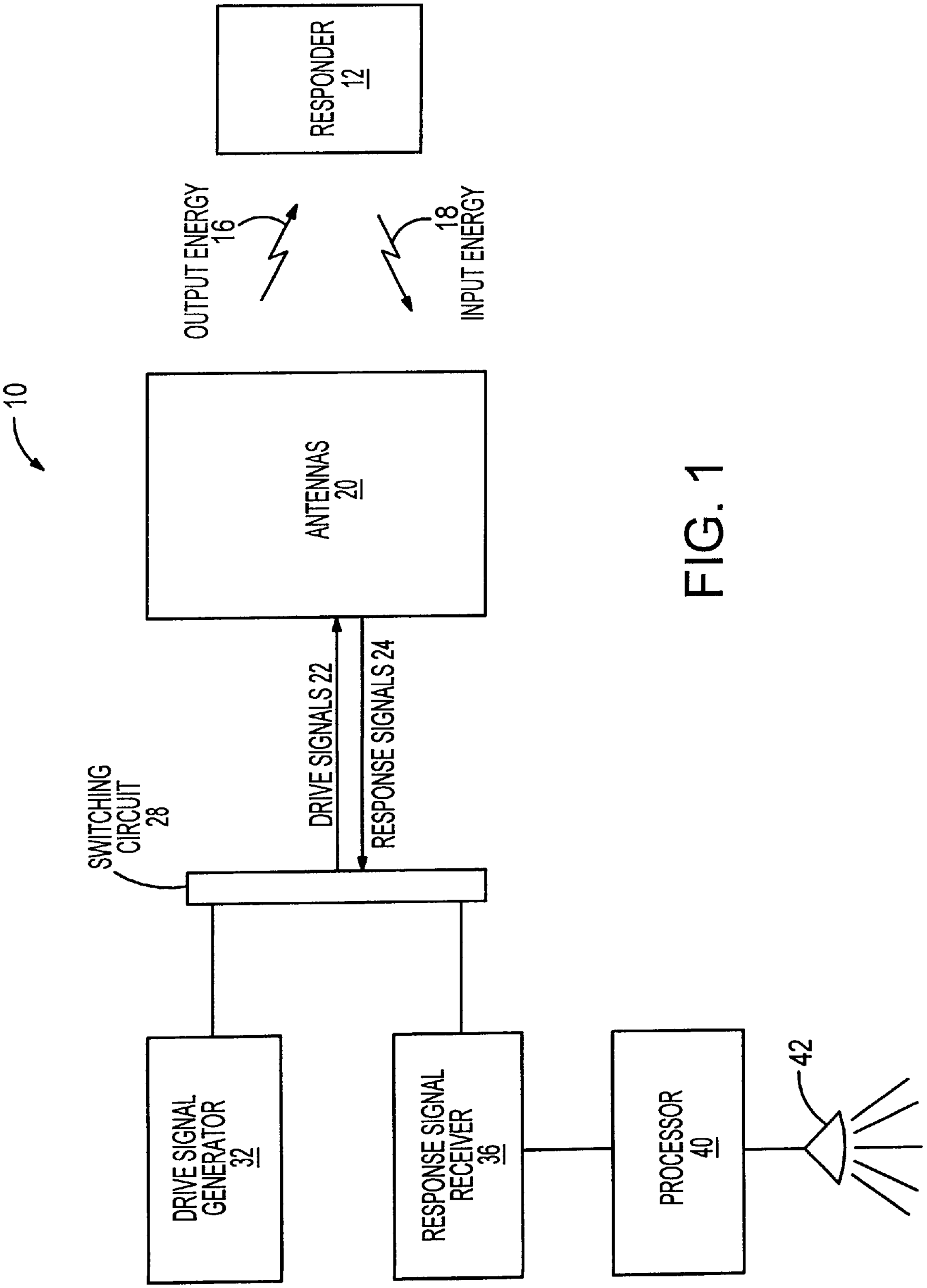
FIG. 1 is a block diagram of a basic inductive location system in accordance with the invention.

FIG. 1 is a block diagram of a basic inductive location sensing system 10 in accordance with the invention. Each component of the basic system is described first, followed by a description of the operation of the system and by a description of various alternative systems.

The responder 12 is a remote device that includes a conventional LC resonant circuit that is tuned to resonate at a particular frequency. The responder is a passive device that does not contain its own power source and that is not physically connected to any other components of the system. In a preferred embodiment, the responder is incorporated into a mallet that is used in conjunction with an electronic percussion instrument. As will be described further below, the responder receives output energy 16 from an antenna 20 and transmits input energy 18 to the antenna. The terms "input energy" and "output energy" are used throughout the specification to refer to the specific directional transfer of electromagnetic energy between the antenna and the responder.

Figure 2:
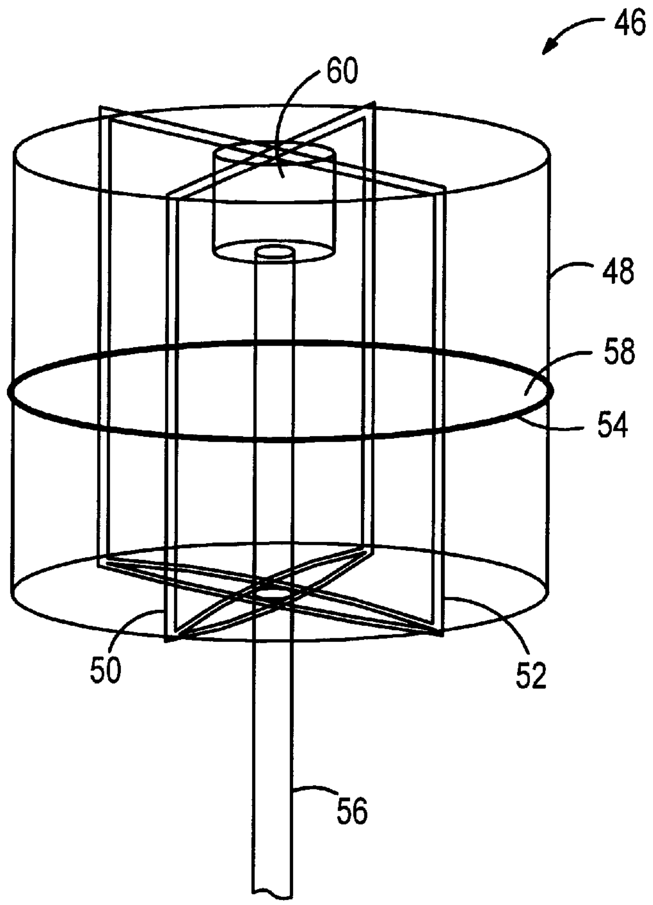
FIG. 2 is a depiction of a responder in the form of a mallet, where the mallet head contains three separate LC resonant circuits.
Figure 3:
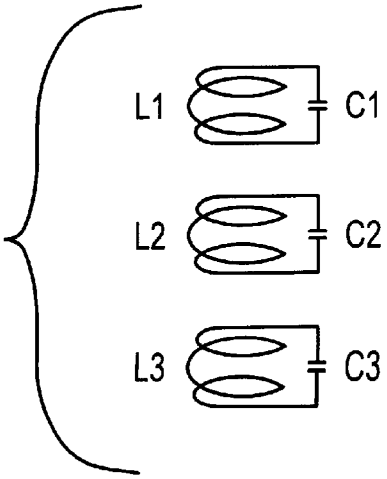
FIG. 3 is a circuit diagram of the three LC resonant circuits formed within the mallet head of FIG. 2.

FIG. 2 is a depiction of a responder in the form of a mallet 46, where the mallet head 48 contains three separate LC resonant circuits 50, 52, and 54. The three LC resonant circuits are composed of wire coils and capacitor combinations which form the three LC circuits as shown in FIG. 3. Referring back to FIG. 2, the shaft 56 of the mallet can be made of wood or any other suitable material. The head of the mallet can be made of synthetic material or any other suitable material that ideally provides a feel and response similar to traditional percussion mallets. The three LC resonant circuits are formed by wrapping conductive wire around the mallet head, attaching capacitors to the respective conducting wires, and locating the capacitors within the mallet head at locations 58 and 60. The configuration of LC resonant circuits is designed to allow location detection regardless of the orientation of the mallet as it strikes the keyboard. If fewer mallet orientations are desired, a mallet head with only one or two LC resonant circuits may be implemented. Although an LC resonant circuit is specified, other frequency-sensitive circuits may be used in place of or in addition to the LC resonant circuit.

In an embodiment of the invention, four mallets are available, with the resonant circuits of each of the four mallets being tuned to a different resonant frequency. For identification purposes, the mallets are color coded. Table 1 identifies the desired frequency, capacitance, number of turns, and color for the four preferred mallets, although none of these specifications is critical to the invention.

TABLE 1

| Mallet No. | Freq (kHz) | Caps 1–3 (Pf) | No. of Turns L1 | L2 | L3 | Head Color |
|---|---|---|---|---|---|---|
| 1 | 312 | 2700 | 40 | 40 | 43 | red |
| 2 | 417 | 1500 | 40 | 40 | 43 | yellow |
| 3 | 555 | 820 | 40 | 40 | 43 | green |
| 4 | 714 | 470 | 41 | 41 | 44 | blue |

Referring back to FIG. 1, the antennas 20 are a combination of two inductive loop circuits that are preferably formed by continuous loops of printed circuit conductors or conductive wire. The antennas are capable of both transmitting and receiving electromagnetic energy, referred to respectively as output energy and input energy. The antennas are capable of transmitting repetitive bursts of electromagnetic energy at particular frequencies, where the term frequency is meant to be synonymous with the center frequency of a conventional frequency distribution generated from an antenna device. In addition, as will be described further below, the antennas receive drive signals 22 and transmit response signals 24 with the terms "drive signals" and "response signals" being used throughout the specification to refer to electrical signals being transferred in the directions depicted.

Figure 4:
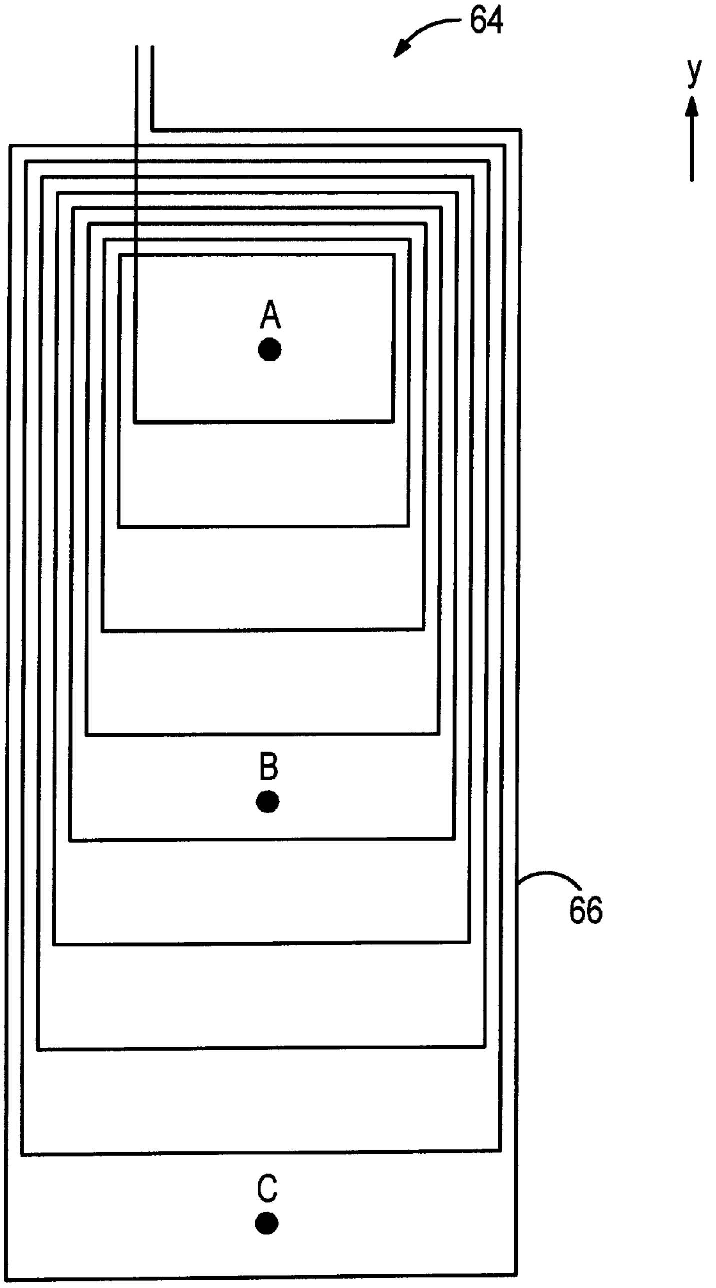
FIG. 4 is a depiction of a preferred inductive loop antenna with a gradated loop configuration in accordance with the invention.

FIG. 4 is a depiction of a single preferred inductive loop antenna 64 with a gradated loop configuration in accordance with the invention. The preferred antenna has a boundary that is identified by the outermost inductive loop 66 and the preferred antenna is formed from a continuous printed circuit conductor on a flat non-conductive surface. As shown, the gradated inductive loop antenna has a variable density of inductive loops depending on the location within the antenna boundary. For example, with respect to the axis through the interior of the antenna the loop density is highest at point A in the antenna and the loop density gradually decreases from point A to point B and from point B to point C. When exposed to input energy from an external source that is at a discrete location and distance, also known as proximity, an antenna configured in the gradated manner of FIG. 4 generates a response signal that relates to the location and proximity of the source of the received input energy. Specifically, for the same amount of input energy, the amplitude of a response signal generated when the source of the input energy is near point A, at a fixed distance X from the antenna, is higher than the amplitude of a response signal generated when the source of the input energy is near point B at a fixed distance X. Similarly, the amplitude of a response signal generated when the source of the input energy is near point C at the fixed distance X is lower than the amplitude of respective response signals from sources of input energy near points A or B at a fixed distance X. In an embodiment of the invention, the antenna is formed on a flat surface into the size and shape of a percussion key. The percussion key is sensitive to the particular location on the key that is struck (or nearly struck) by the specially equipped percussion mallet. It should be noted that other arrangements of gradated loop density may be used although all of the possibilities are not described. In addition, it should be noted that non-loop antennas may be implemented such that antenna density varies over a dimension of a key area, thereby generating response signals with amplitudes that are related to the location of an energy source. The operation of the inductive sensor system is described in further detail below.

Figure 5:
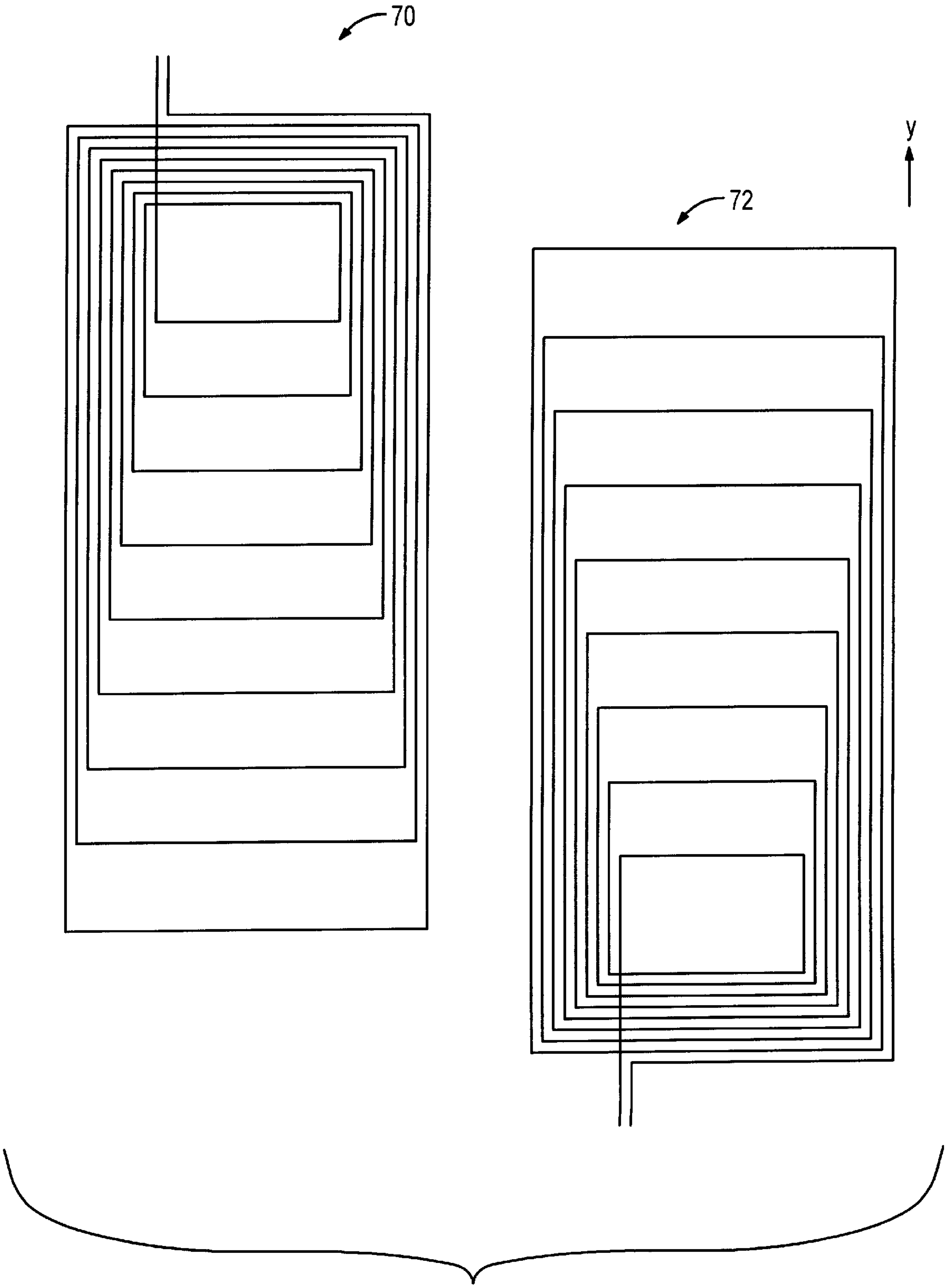
FIG. 5 is a depiction of two gradated inductive loop antennas, one with higher loop density toward the bottom and the other with higher loop density toward the top. The two antennas are preferably superimposed on each other, but are drawn separately for clarification.

In order to determine location along an axis and distance away from an antenna using a gradated inductive loop antenna 64 as shown in FIG. 4, two gradated inductive loop antennas 70 and 72 can be overlapped with one another, with the highest loop densities being opposite to each other. FIG. 5 depicts the two gradated inductive loop antennas spaced apart in the vertical (y) direction at a preferred relative distance when configured in an overlapping orientation. The two antennas are not shown as overlapping so that the two antennas can be distinguished for description purposes. Preferably, the two overlapping antennas are separated by a non-conductive material, for example, the antennas can be formed on opposite sides of a printed circuit board. Providing overlapping gradated inductive loop antennas allows for continuous position determination along the vertical dimension of a key boundary as well as proximity determination of an object relative to the antennas. With the overlapping antenna arrangement, response signals are generated by both antennas and the response signals are combined to calculate a precise location of mallet contact along the vertical direction of the key. The first order linear approximation for location (L) given amplitudes $A_1$ and $A_2$ from two antennas is:

$$L = \frac{A_2}{A_1 + A_2},$$

where L is normalized to a range of 0–1.

Figure 6:
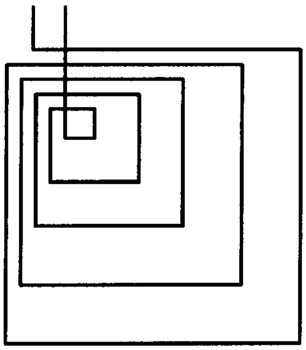
FIG. 6 is an alternative example of a gradated inductive loop antenna in accordance with the invention.
Figure 7:
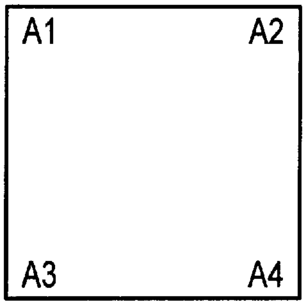
FIG. 7 identifies an arrangement of four antennas as shown in FIG. 6 with each antenna being oriented such that its area of high loop density is at a different corner of the antenna boundary.

In an enhancement of this arrangement, four square-shaped gradated antennas as shown in FIG. 6 can be superimposed on each other to enable location determination in two dimensions. In one example of the enhancement, each one of the four antennas has an area of high loop density in one corner of the overall antenna boundary. With four areas of high loop density distributed as in FIG. 7, the two dimensional calculations in the X and Y directions are:

$$X = \frac{A_2 + A_4}{A_1 + A_2 + A_3 + A_4} \quad \text{and} \quad Y = \frac{A_1 + A_2}{A_1 + A_2 + A_3 + A_4}$$

Figure 8:
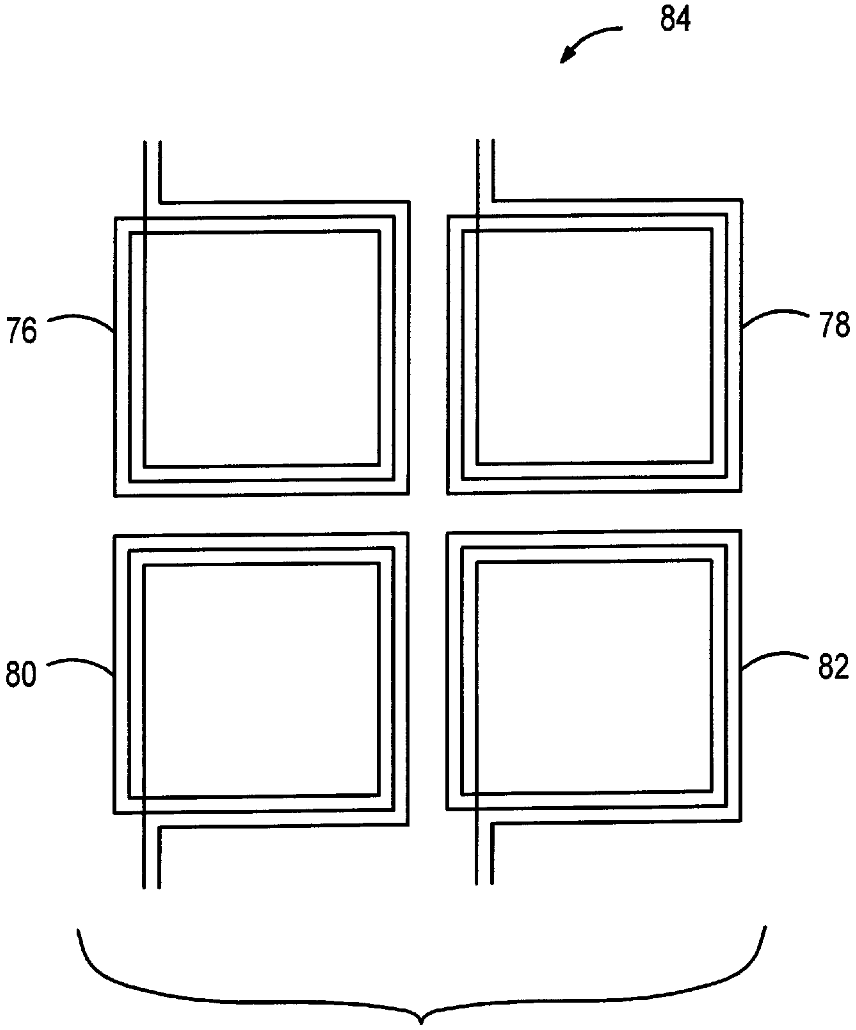
FIG. 8 is a depiction of an array of four inductive loop antennas in accordance with the invention.

FIG. 8 is a depiction of an alternative arrangement of multiple inductive loop antennas that can be utilized to determine location relative to an LC resonant circuit that is tuned to the same frequency that is generated by all of the antennas. In FIG. 8, four antennas 76, 78, 80, and 82 are arranged in an array 84, preferably in the same plane, and output energy is generated from the antennas in a sequential manner. When an LC resonant circuit is near one of the four antennas, the nearest antenna will generate the strongest response signal relative to the other antennas, thereby identifying a position with respect to the four antennas. Although the multiple antenna arrangement works well for determining a discrete location among antennas, the arrangement does not easily enable the identification of continuous locations within the boundary of a single antenna.

Figure 9:
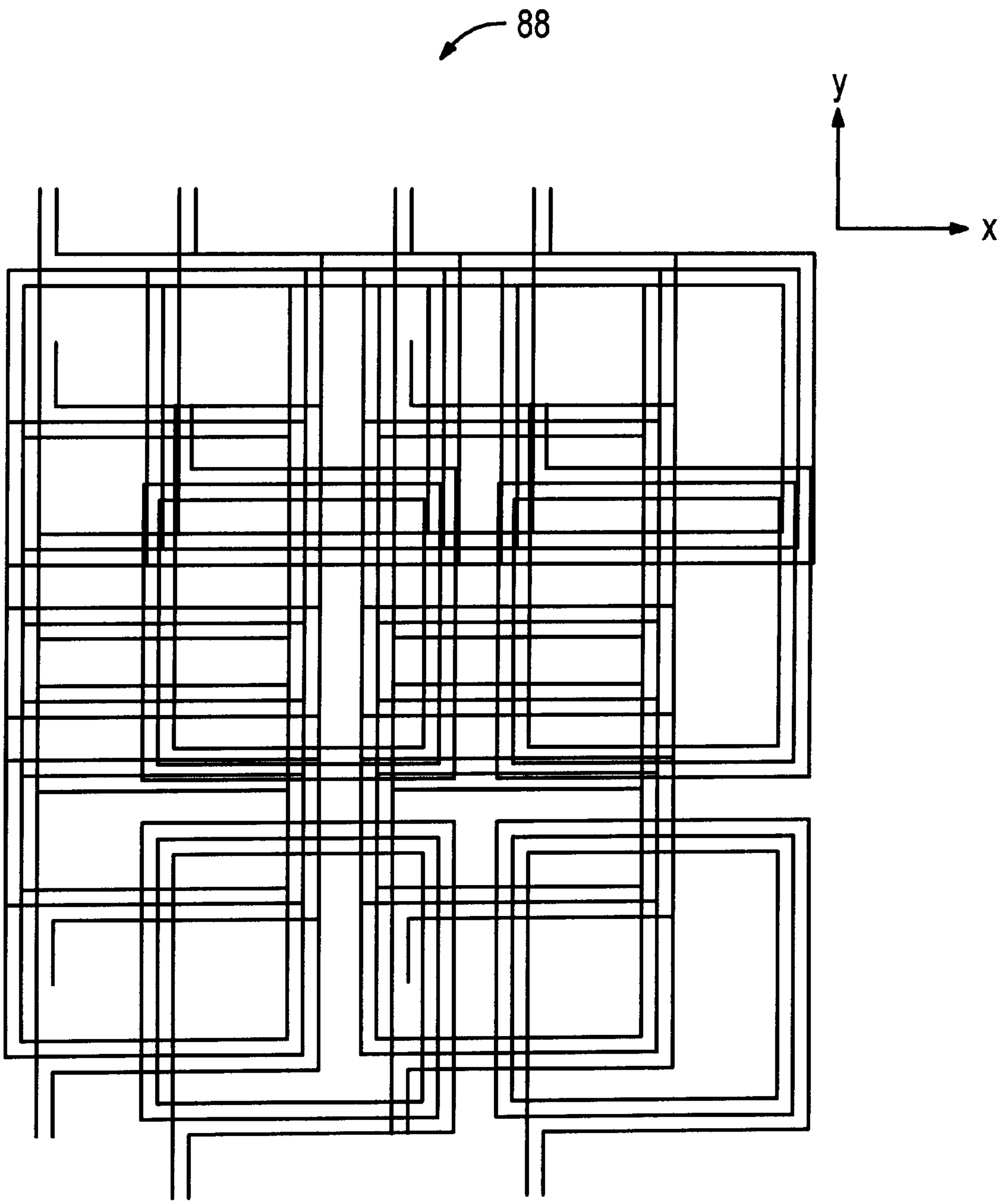
FIG. 9 is an arrangement of four layers of antennas as depicted in FIG. 6 formed by superimposing four copies of the antennas from FIG. 6 on top of each other and displaced by one-half of the length of one of the square sides of one antenna.

FIG. 9 is a depiction of an array 88 of antennas formed in different planes that allows continuous position identification in two dimensions (i.e., x and y). The arrangement of FIG. 9 is formed by superimposing four copies of the array 84 of FIG. 8 on top of each other displaced by one-half of the length of one of the square sides of one antenna. The result is sixteen individual inductive loop antennas formed in four separate planes, with the four planes being separated by non-conductive material, such as printed circuit board material. To determine a precise position of an LC resonant circuit relative to the layered antenna array 88, one antenna from each plane is identified as being nearest to the LC circuit within that plane. The known locations of the four antennas (one from each plane) are combined to identify a more precise location within the boundary of the multilayered array.

Referring back to FIG. 1, the switching circuit 28 is provided to connect the antennas 20 to the drive signal generator 32 and the response signal receiver 36. The switching circuitry may be required to rapidly sequence between the drive signal generator and the response signal receiver and between multiple antennas and/or multiple responders. The switching circuit is any conventional device or combination of devices that provides the necessary functionality. The switching circuit is not critical to the invention and is not required to be oriented exactly as shown in FIG. 1.

The drive signal generator 32 controls the output energy 16 that is emitted from the antenna 20. Specifically, the drive signal generator determines the timing, the frequency, and the intensity of energy that is emitted from the antenna. The drive signal generator activates the antenna through drive signals 22 that are transmitted to the antenna. The switching circuit 28 coordinates timing of drive signals to the antennas and the reception of input energy by the response signal receiver 36, so that signals are sent and received in an orderly fashion. The timing of drive signals is more important because multiple antennas are involved. For example, when there are multiple antennas such as shown in FIGS. 5–9 the drive signals are preferably separated by some interval of time so that the antennas can be clearly distinguished from each other. The frequency of output energy generated by the drive signals can be manipulated over a range of frequencies in order to create a multiple frequency system. In a preferred embodiment, there are four frequencies per key, and therefore the drive signal generator must be able to sequentially drive the inductive loop antennas at all four of the frequencies.

The intensity of output energy generated from the drive signals can be manipulated to affect the range with which a responder can be sensed. For example, if the output energy emitted from an antenna is more intense, a responder will be effective at a further distance, and vice versa a lower output energy will make a responder effective at a shorter distance. In a multiple key arrangement, each key is composed of antennas emitting output energy at the same frequencies and therefore the intensity of the output energy must be set at a level that does not create unacceptable interference between keys. Adjusting the intensity of the output energy in a percussion keyboard implementation allows the sensitivity of the keyboard to be set so that mallets activate the keyboard keys at the desired distance relative to the keys. For example, the keyboard can be adjusted to respond when a mallet is less than one centimeter from the key or when a mallet is five centimeters from the key. In another embodiment, the distance sensitivity is adjusted by setting gains and thresholds in the response signal receiver 36.

The response signal receiver 36 manipulates the response signals 24 to transform the input energy 18 into digital electrical signals. In order to transform the input energy into digital electrical signals, frequency filters, analog detectors, and/or analog-to-digital converters may be implemented. Frequency filtering is preferred when multiple frequencies are emitted from an antenna. The response signal receiver preferably maintains key activation thresholds that allow a key to be activated only when received input energy exceeds a specific key activation threshold. The activation thresholds can be adjusted to create different sensitivities between the mallet and keys. The activation thresholds also function to prevent a single mallet from activating more than one key at a time.

The processor 40 is a conventional processor that may include hardware and software. In a preferred embodiment, the processor converts digital signals into control signals (i.e., MIDI signals) and/or sound in accordance with a pre-established arrangement. Control signals related to the digital signals identify which key has been activated when more than one key is present and the amplitude of the digital signals is used to determine the location within the boundary of a key that has been activated. In a preferred embodiment, the keys are calibrated with known parameters to develop known relationships between amplitude and location within the boundary of a key. The processor can be connected to a speaker 42 or speaker system in order to project related sounds. The processor may be a synthesizer as used in musical presentations.

Operation of inductive location sensing systems in accordance with the invention are described below with reference to systems of increasing complexity. The first, and most basic system, has a single key formed from two gradated antennas 70 and 72 as described with reference to FIG. 5, with the single key operating at one frequency and being responsive to a single tuned responder such as the mallet 46 described with reference to FIG. 2. With reference to FIG. 1, in operation the drive signal generator 32 transmits drive signals 22 to the antennas 20, causing the inductive loop antennas to transmit bursts of output energy 16 at a specific frequency. The output energy is transmitted to the surrounding environment and received by responder 12. The LC resonant circuit within the receiving responder transmits input energy 18 at the same frequency back to the antennas in response to the output energy. The antennas receive the input energy and generate response signals 24 that are sent to the response signal receiver. The response signal receiver measures the amplitude of the response signals and indicates that the key has been activated if the activation threshold is exceeded. In addition, the amplitude of the response signals received by the antennas relates to the loop densities at the location within each antenna that is nearest to the source of the input energy, and the amplitude relates to the proximity of the responder relative to the antennas. The amplitudes of the signals can be used to calculate a location along the vertical axis of the antennas when the antennas are oriented as shown in FIG. 5. Once the location of the responder relative to the antennas is known, a control signal that relates to a sound or an aspect of a sound (i.e., pitch, timbre, envelope characteristic) assigned to the specific location within the antennas, or key, can be identified. In this method of operation, multiple antenna pairs can be arranged to create a multi-key keyboard where each antenna pair outputs energy at the same frequency and is responsive to a responder or responders tuned to the same frequency. It should be pointed out that physical contact between the antennas and the responder is not the mechanism that activates a key. Rather it is the transmission of energy between the passive inductive loop antennas and the LC resonant circuit equipped responder that triggers activation of a key.

In an additional level of complexity, a system with two overlapping gradated inductive loop antennas 70 and 72 as shown in FIG. 5 can be driven at four different frequencies and be activated by four different frequency-specific responders. In operation, referring to FIG. 1 the antennas 20 are controlled to generate output energy 16 at the four frequencies either simultaneously or sequentially. Whether simultaneous or sequential, the four frequencies are transmitted from the antennas to any frequency-specific responders. The frequency-specific responders transmit frequency-specific input energy back to the antennas in response to the frequency-specific output energy. The antennas then transmit response signals to the response signal receiver. If a frequency-specific response signal exceeds an activation threshold, then it is concluded that the corresponding frequency-specific responder is near the key and a key active signal is transmitted. The response signal receiver 36 and processor 40 are configured to decipher the frequency of the received energy and a control signal particular to the frequency and the key is generated. If a responder tuned to another frequency transmits frequency-specific input energy that causes the activation threshold to be exceeded, then the corresponding key active signal is generated. With four different activation frequencies, two gradated antennas used to form a key can generate control signals that relate to different aspects of a sound for each activation frequency and thus each mallet. In addition, for the same activation frequency, an aspect of a sound (i.e., pitch, timbre, envelope characteristics, attack time, delay time) can be related to a location along the vertical axis of the key. When applied to a percussion musical instrument, one key can be sensitive to four different frequency-specific mallets and sensitive to mallet location along the vertical axis of the key. A system having multiple keys of this type allows the flexibility to generate a wide range of sounds with a limited number of keys and mallets.

Figure 10:
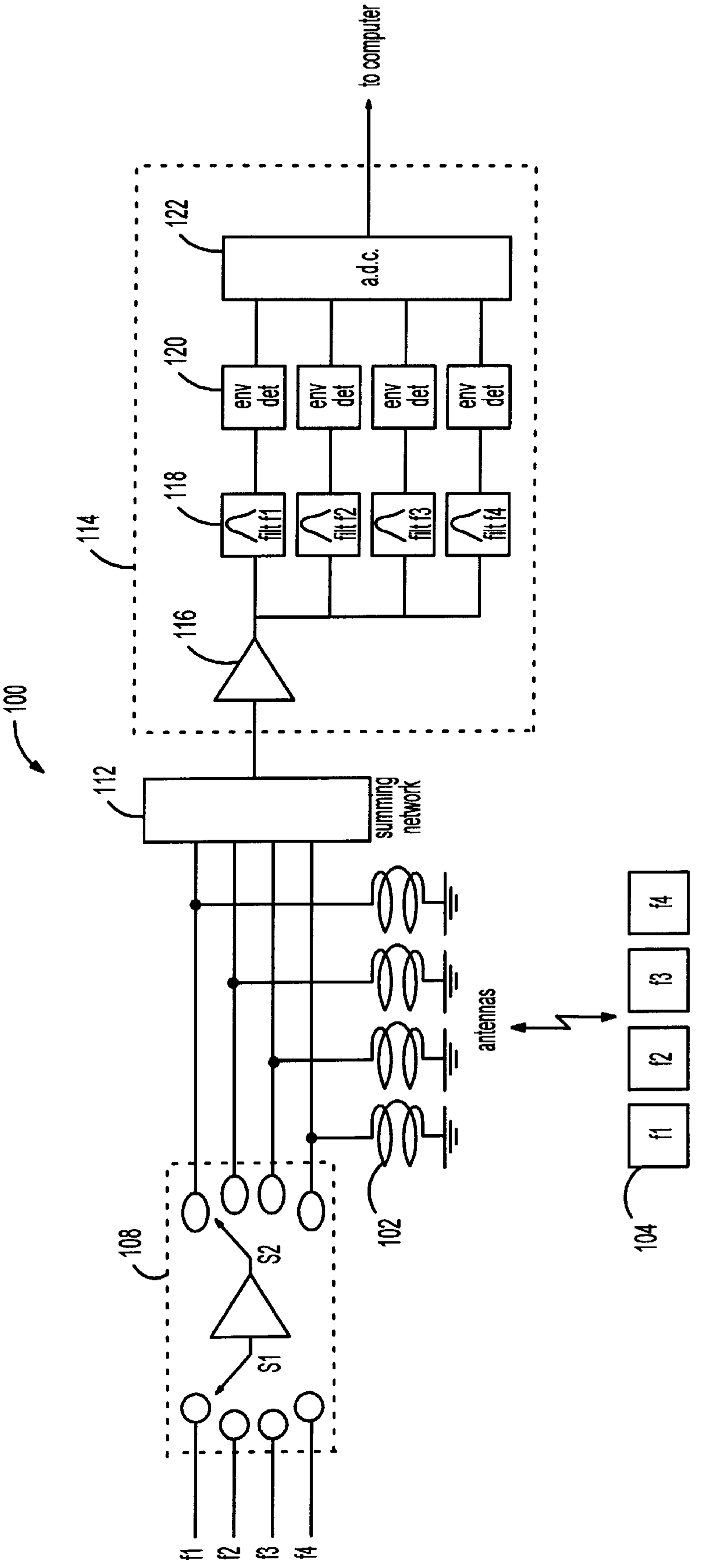
FIG. 10 is a depiction of a four antenna, four frequency system that can be activated by any one of four frequency-specific responders in accordance with the invention.

Another embodiment of the invention utilizes a four antenna array 84 as disclosed in FIG. 8 in combination with a single frequency responder with the four antennas transmitting output energy at the same frequency to which the responder is tuned. In operation, the antennas 72–82 are controlled so that output energy is transmitted sequentially from each of the four antennas. Output energy received by a responder is retransmitted to the antennas and transformed by the antennas into response signals. The amplitudes of the response signals from the four antennas will indicate the location of the responder relative to the four antennas. While this system works well for determining discrete positioning with respect to the four antennas, it does not work as well for indicating continuous positioning within the boundary of a single antenna. In addition to operating a four antenna system at a single frequency, the four antenna system can also be operated at four different frequencies and activated by four different responders as described above. FIG. 10 is a depiction of a four antenna 102, four frequency system 100 that can be activated by any one of four frequency-specific responders 104. The system includes a switching network 108 to drive the four antennas at the four frequencies in addition to a summing network 112 that collects response signals from the antennas. The response signal receiver 114 includes an amplifier 116, frequency-specific filters 118, frequency-specific envelop detectors 120, and an analog-to-digital converter 122.

In another embodiment, a system including multiple layers of offset antenna arrays can be implemented to provide more continuous positioning information when operated at a single frequency. An example multi-layer antenna is described with reference to FIG. 9. By offsetting the antenna arrays between layers and sequentially driving the array of antennas on each layer, location information in two dimensions can be obtained for each layer and the location information can be combined to provide more precise (i.e., continuous) location information. More precise location information can be obtained because the sixteen individual antennas overlap in four layers, producing a matrix of individual inductive loops. In addition to operating a sixteen antenna system at a single frequency, the system can be operated at four different frequencies and activated by different responders.

While the overlapping gradated antennas and multiple antenna arrays are described as having a specific number and configuration of antennas, other numbers and configurations of antennas are possible and would be easy to create by one of ordinary skill in the art. In addition, the number of operating frequencies can vary and is not critical to the invention.

It is important to note that the above examples are generally described with reference to what would be a single key in an electronic percussion musical instrument. In a preferred embodiment, an instrument would have multiple keys, all functioning in the manner as described above. That is, an instrument may have twenty-plus keys that each utilize two gradated-antennas. Each key operates simultaneously at the same four frequencies and can be triggered by the proximity of one of four frequency-specific mallets. Typically, the mallets will contact keys during the playing of music, although contact between the keys and the mallets does not trigger the corresponding sounds. Rather, as described, sound is triggered when sufficient electrical energy is transmitted between an antenna and a responder and subsequently received by the antenna. Each key can generate a wide range of sounds because each key is sensitive to four different mallets and to the location on each key that is struck by a mallet. The sounds that correspond to the keys are fully programmable and adjustable.

In an enhancement of the system, the inductive location sensors can be configured to determine the approach and/or release velocity of a responder as the responder travels toward or away from the antennas. Velocity is determined in accordance with the invention by comparing the change in proximity of a responder over a time interval. Change in proximity is determined based on the change in amplitude of a signal over a time interval. That is, velocity is determined by comparing the change in amplitude of a response signal that is caused by an approaching or releasing responder. The time intervals used to measure changes in amplitude are short enough (i.e., 1 ms) that at least two amplitude measurements can be made while the responder is within the transmission range of the antenna and traveling in the same direction. When applied to a percussion instrument, knowing the velocity of approaching or releasing mallets adds another dimension to the capabilities of the keyboard. For example, the intensity of sound generated by a mallet strike can be related to the velocity with which the mallet approaches the inductive loop antenna equipped key.

Figure 11:
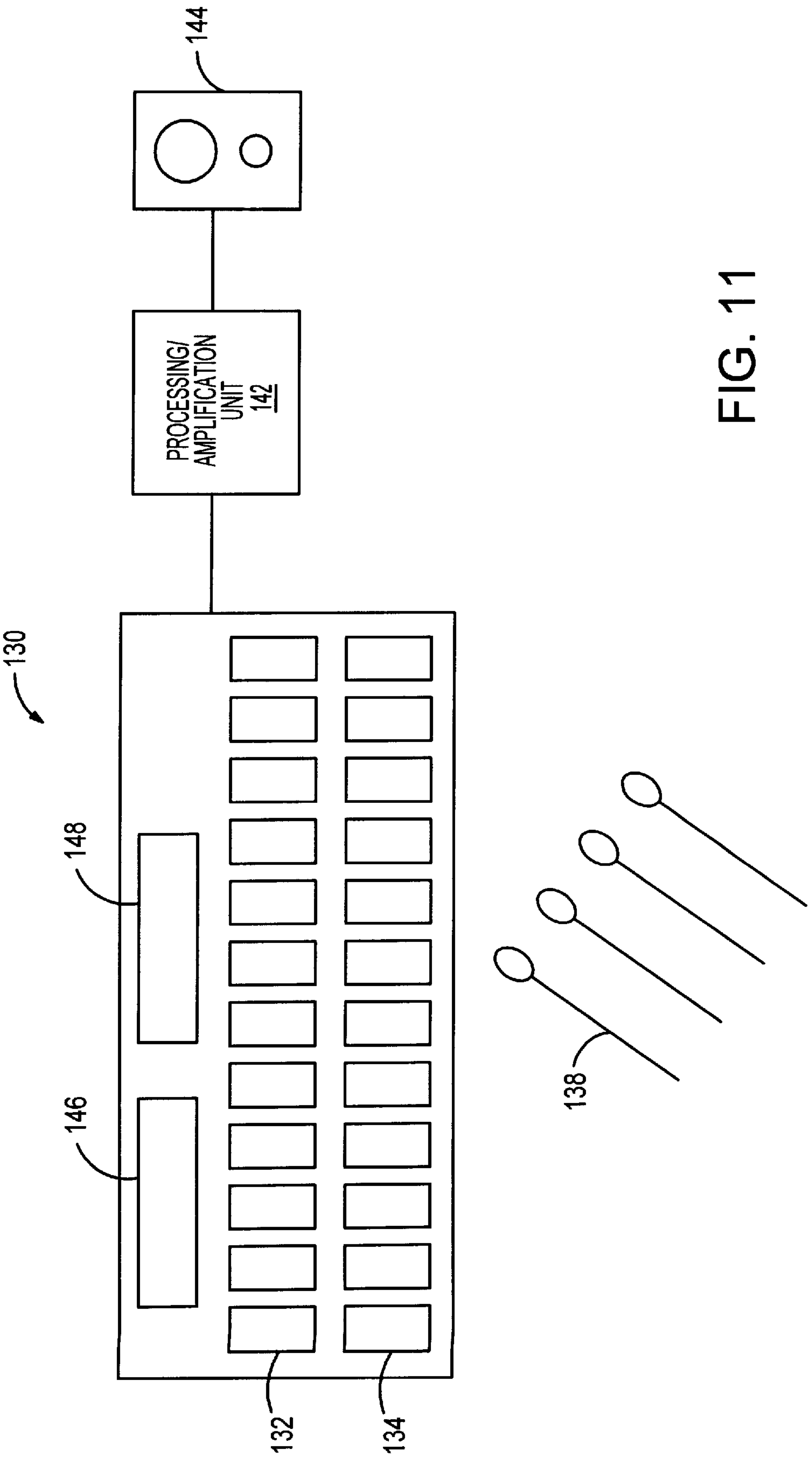
FIG. 11 is a depiction of an electrical percussion instrument utilizing the inductive sensors in accordance with the invention.

In a preferred embodiment, the inductive loop sensing system is integrated into a percussion instrument such as a marimba. Specifically, a multiple key percussion keyboard system 130 as depicted in FIG. 11 consists of multiple keys 132 and 134 with each key having two gradated inductive loop antennas overlapping in a manner as described with reference to FIG. 5. Each key emits output energy at four different frequencies and therefore is sensitive to four different frequency-specific mallets 138. The system is also configured to be responsive to mallet approach and release velocities. In sum, each key has continuous responsiveness over the vertical dimension of the key, each key is responsive to four different mallets, and each key is responsive to the approach and release velocities of the mallets. The preferred system as depicted in FIG. 11 is equipped with twenty-four keys and provides a wide range of variables that can be utilized to create rich musical sound. In addition, the system includes a processing/amplification unit 142 and a speaker unit 144 necessary to produce musical sounds.

A preferred percussion keyboard system has its keys traditionally arrayed in four one-third octaves of electronic bars. Additionally, the percussion keyboard system 130 is configured to have a MIDI output. The keyboard may include user interfaces 146 and 148, such as LED displays and/or touch-sensitive functionality. The system can have mallet-activated editing. Further, the system can include electronic versions of pitch wheels, pan pots, level sliders, and modulation wheels all based on the principles of this invention.

Figure 12:
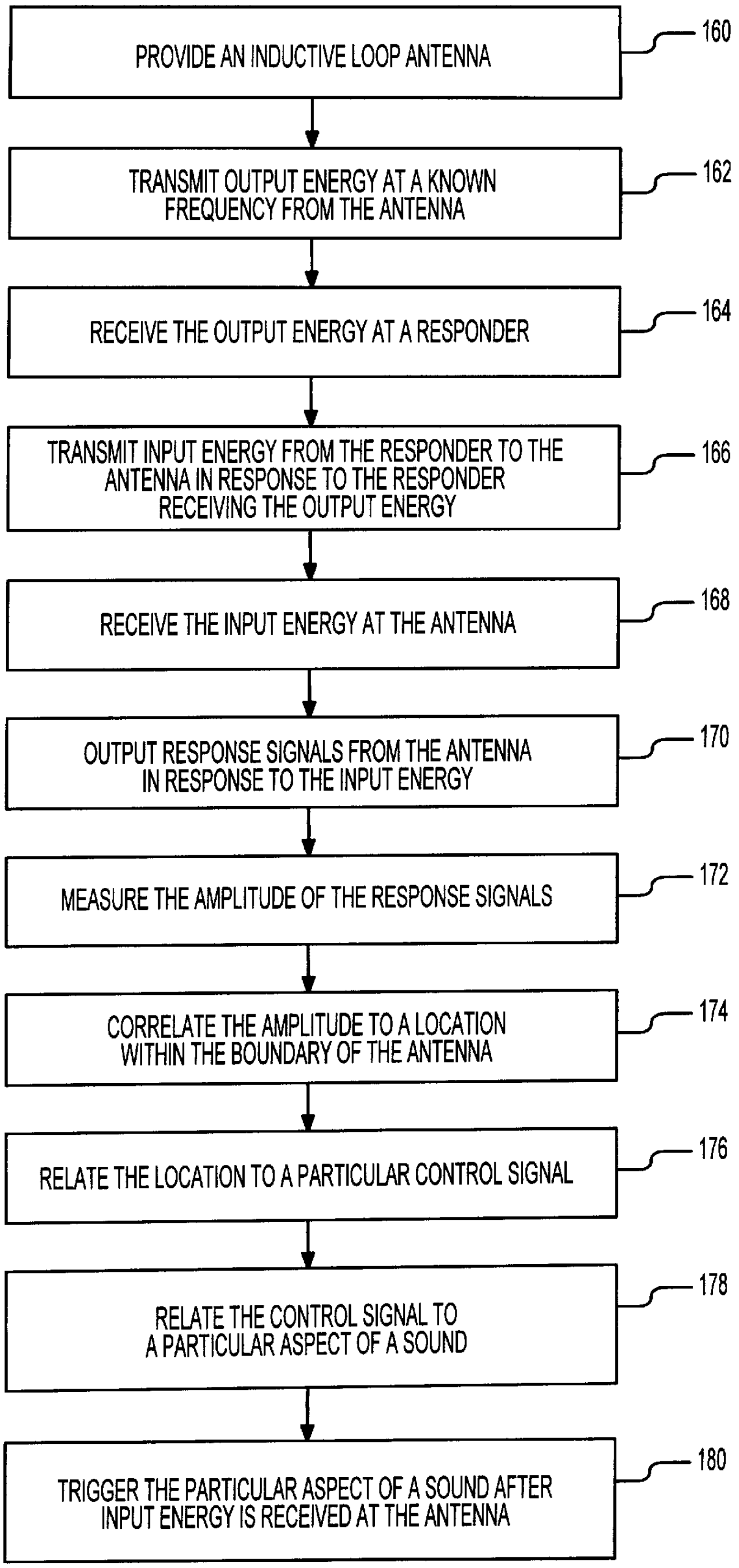
FIG. 12 is a process flow of a preferred method for activating keys on a keyboard in accordance with the invention.

A preferred method for activating a key on an electric percussion keyboard is depicted in the process flow diagram of FIG. 12. In a step 160, an inductive loop antenna that forms a boundary of a key on an electronic percussion instrument is provided. In a step 162, output energy at a known frequency is transmitted from the inductive loop antenna. In a step 164, output energy at the known frequency is received at a responder, where the responder has an LC resonant circuit tuned to the known frequency. In a step 166, input energy at the known frequency is transmitted from the responder to the inductive loop antenna. In a step 168, the input energy at the known frequency is received at the inductive loop antenna. In a step 170, response signals are output from the inductive loop antenna in response to receiving the input energy from the responder. In a step 172, the amplitude of the response signals is measured. In a step 174, the measured amplitude of the response signals is correlated to a location within the boundary formed by the inductive loop antenna. In an enhanced step 176 of the invention, the location within the boundary formed by the inductive loop antenna is related to a particular control signal. In a step 178, the control signal is related to a particular aspect of a sound. In a step 180, the particular aspect of a sound is triggered after the input energy is received at the inductive loop antenna.

Although the inductive location system is specifically described with respect to a musical instrument, the inductive loop location system can be applied to other uses, for example graphical user interfaces for computers and games. In addition, although the musical instruments are described as percussion instruments, the inductive location system can be applied to non-percussion instruments.

What is claimed is:

1. An inductive location sensor system comprising:

a structure having a first surface;

inductive antenna means fixed to said first surface, said inductive antenna means having a plurality of operatively associated antenna segments that are configured to form a varying segment density within a boundary defined by said inductive antenna means, said inductive antenna means being responsive to drive signals to generate output energy at a first frequency, said inductive antenna means being responsive to input energy of said first frequency received from an external source to generate response signals having amplitudes that are related to a segment density at a location within said boundary proximate to said external source of said input energy; and a responder having a resonant circuit that is specific to receiving said output energy at said first frequency and to transmitting said input energy at said first frequency in response to receiving said output energy, thereby being enabled to operate as said external source.

2. The inductive location sensor system of claim 1 further including a drive signal generator that is operationally connected to said inductive antenna means and that includes circuitry for generating drive signals that cause said inductive antenna means to generate output energy at said first frequency and at a second frequency.

3. The inductive location sensor system of claim 2 further including a second responder having a resonant circuit that is specific to receiving said output energy at said second frequency and to transmitting input energy at said second frequency in response to receiving said output energy at said second frequency.

4. The inductive location sensor system of claim 3 further comprising:

a response signal receiver operationally connected to said inductive antenna means, said response signal receiver having circuitry for filtering said response signals at said first and second frequencies, for determining said amplitudes of said response signals, and for converting said response signals from analog to digital signals; and a processor for transforming said digital signals into control signals that relate to said first and second responders.

5. The inductive location sensor system of claim 1 further including a processor operationally connected to said inductive antenna means, said processor having circuitry for generating audio signals from said response signals wherein said audio signals relate to said location within said boundary of said inductive antenna means that is proximate to said external source of said input energy is received.

6. The inductive location sensor system of claim 1 wherein said inductive antenna means includes two overlapping gradated antennas with each antenna fixed to said first surface, and being responsive to said drive signals to generate output energy at said first frequency, said two antennas being responsive to input energy of said first frequency received from said external source to generate response signals having amplitudes that are related to a segment density at a location within said boundary proximate to said external source of said input energy.

7. The inductive location sensor system of claim 1 further including a processor having circuitry that determines a rate of change of amplitude of said response signals that are output from said inductive antenna means.

8. The inductive location sensor system of claim 1 wherein said inductive antenna means includes at least two inductive loop antennas having multiple inductive loops that are configured to form a varying loop density and wherein said responder includes an inductor-capacitor resonant circuit that resonates at said first frequency.

9. A method for activating a key on an electronic percussion keyboard comprising the steps of:

transmitting output energy at a first frequency from first and second inductive antennas that define a key of an electronic keyboard;

receiving said output energy at said first frequency at a first responder, said first responder having a resonant circuit that is specific to receiving said first frequency;

transmitting input energy at said first frequency from said first responder to said first and second inductive antennas in response to receiving said output energy at said first frequency;

receiving said input energy at said first frequency at said first and second inductive antennas;

outputting response signals from said first and second inductive antennas in response to receiving said input energy from said first responder;

tracking at least one variable of said response signals that are output from said first and second inductive antennas; and correlating said tracking of said at least one variable of said response signals to a location within said key.

10. The method of claim 9 further including steps of:

relating said location within said key to a control signal; and initiating a particular aspect of a sound that is related to said control signal after said input energy received at said first and second inductive antennas causes an activation threshold to be exceeded.

11. The method of claim 10 wherein said step of receiving said output energy at said first responder includes a step of building an oscillating current in said resonant circuit.

12. The method of claim 9 wherein:

said step of transmitting output energy at a first frequency includes a step of transmitting output energy at a plurality of frequencies; and said step of receiving said output energy at said first frequency at said first responder includes a step of receiving output energy of each different frequency from said plurality of frequencies at a different one of a plurality of frequency-specific responders.

13. The method of claim 12 wherein said step of transmitting output energy includes a step of transmitting output energy from a plurality of overlapping inductive loop antennas.

14. The method of claim 9 wherein said step of correlating includes a step of comparing the amplitude of said response signals that are output from said first and second inductive antennas.

15. An electronic instrument comprising:

means for transmitting and receiving electromagnetic energy at a first frequency from an area of a key and for identifying a specific location within said area of said key that is proximate to an external source of said electromagnetic energy; and a device including a circuit tuned to receive and transmit electromagnetic energy at said first frequency, wherein electromagnetic energy at said first frequency transmitted from said device to said means for transmitting and receiving initiates a control signal.

16. The electronic percussion instrument of claim 15 wherein said device includes a plurality of identical frequency-specific LC resonant circuits integrated into said device in different planes to enable said device to be responsive to electromagnetic energy in multiple device orientations and wherein said device is not physically connected to said means for transmitting and receiving.

17. The electronic percussion instrument of claim 15 wherein:

said means for transmitting and receiving includes a plurality of keys wherein each key includes at least two inductive loop antennas having multiple inductive loops that are configured to form a varying loop density within a boundary defined by said inductive loop antennas, said two inductive loop antennas being responsive to drive signals to generate output energy at a first frequency, said two inductive loop antennas being responsive to input energy received from said external source to generate response signals having amplitudes that are indicative of loop density at a location within said boundary of said first and second inductive loop antennas that is proximate to said external source of input energy; and said device includes an LC resonant circuit tuned to receive said output energy at said first frequency and to transmit said input energy at said first frequency in response to receiving said output energy.

18. The electronic percussion instrument of claim 17 further including:

means for receiving said response signals from said two inductive loop antennas of each key and for transforming said response signals into digital signals; and means for correlating said digital signals into specific aspects of sounds based upon which key from said plurality of keys is activated by said device and based upon said location within said boundary of said two inductive loop antennas that is proximate to said external source of said input energy.

19. The electronic percussion instrument of claim 18 wherein each key includes third and fourth inductive loop antennas partially overlapping said first and second inductive loop antennas wherein said third and fourth inductive loop antennas have multiple inductive loops that are configured to form a varying loop density within a boundary defined by said first, second, third, and fourth inductive loop antennas, said third and fourth inductive loop antennas being responsive to drive signals to generate output energy at said first frequency, said third and fourth inductive loop antennas being responsive to input energy received from said external source to generate response signals having amplitudes that are indicative of loop density at a location within said boundary that is proximate to said external source of input energy, wherein response signals from said first, second, third, and fourth inductive loop antennas allow generation of two-dimensional location information within said boundary.

20. The electronic percussion instrument of claim 15 wherein said means for transmitting and receiving is responsive to drive signals to generate electromagnetic energy at a plurality of frequencies, and further comprising additional devices where the total number of devices is equal to the number of frequencies in said plurality of frequencies, said devices being frequency-specific devices such that each one of said devices is specific to a different one of said plurality of frequencies.

* * * * *